(No Model.)

O. COOLEY.
CHAIN BELT TIGHTENER.

No. 389,836. Patented Sept. 18, 1888.

Witnesses
C. A. Cooley.
Wm B. Sylvester

Inventor
Orville Cooley
By G. W. Ford
Atty.

UNITED STATES PATENT OFFICE.

ORVILLE COOLEY, OF BATAVIA, NEW YORK, ASSIGNOR TO GEORGE E. DANA, OF SAME PLACE.

CHAIN-BELT TIGHTENER.

SPECIFICATION forming part of Letters Patent No. 389,936, dated September 18, 1888.

Application filed April 2, 1888. Serial No. 269,406. (No model.)

*To all whom it may concern:*

Be it known that I, ORVILLE COOLEY, a citizen of the United States, residing at Batavia, in the county of Genesee and State of New York, have invented a new and useful Improvement in Chain-Belt Tighteners, of which the following is a specification.

My invention relates to improvements in chain-belt tighteners which are more especially applicable for use in connection with the chain which transmits the power from the ground-wheel of a harvester (of the Appleby type) to the working mechanism thereof; and the object of the invention is to provide a simple device whereby the slack of the chain may be taken up and at the same time preserve a uniform tension of the same when the position of the ground-wheel shall be changed relatively with the harvester-frame during the process of vertically adjusting the height of cut in the machine. I attain this object by the mechanism illustrated in the accompanying drawings, in which—

Figure 1:
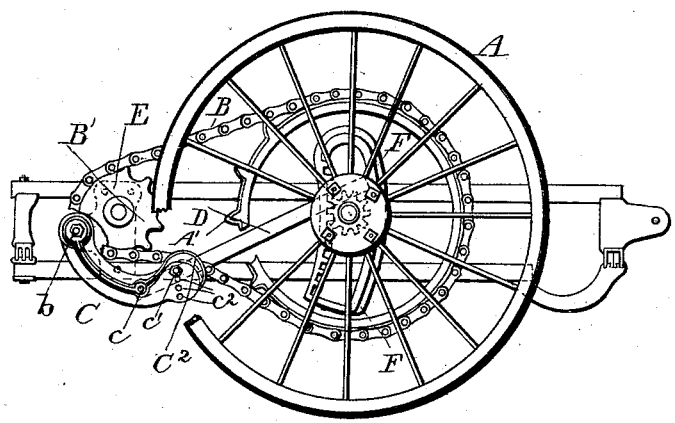
Figure 2:
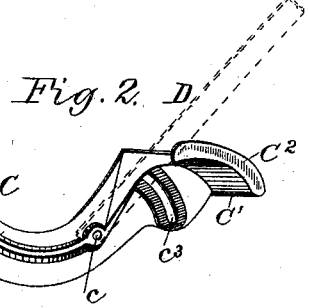
Figure 3:
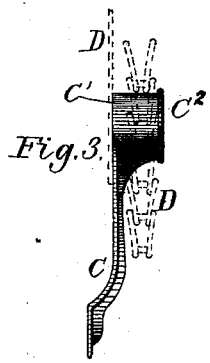

Figure 1 is a side view of the ground-wheel with a portion of the gear-frame, and showing the tightener in working position. Fig. 2 is a perspective view of the tightener detached; and Fig. 3 is a top plan view of the tightener detached, with a portion of the drive-chain in working position.

Similar letters refer to similar parts throughout the several views.

The ground-wheel A has attached thereto the sprocket-wheel A', carrying the sprocket-chain B, whereby motion is communicated to sprocket-wheel B', mounted upon a suitable shaft connecting with the machinery to be operated.

C is the tightening-arm, preferably made of malleable cast-iron, having a convex bearing, C', extending laterally from its free end, upon which the sprocket-chain rests, the said chain being kept from lateral displacement by the flange $C^2$ upon one side, and by the metallic adjusting-bar D upon the other side. The arm C is pivoted at its rear end by pin $b$ to a supporting-standard, (designated E and shown in dotted lines.)

$c$ is a pivot-bolt passing through the arm C and bar D.

$c'$ is a securing-bolt, which passes through one of the adjusting-holes $c^2$ in arm C, also through a hole in bar D, the object of which will be hereinafter explained.

In place of the adjusting-holes made in the arm C, an elongated slot, $c^3$, (see Fig. 2,) may be used, having a raised serrated rib upon either side and a correspondingly-serrated washer, (not shown,) through which the bolt $c'$ passes, and by which the arm C and bar D may be clasped together and secured in the desired position.

It will be observed that my tightener is more especially designed for use upon the class of harvesters which are vertically adjusted by the use of a spur-pinion secured to the ground-wheel arbor, the said pinion engaging with a toothed rack, (herein designated F,) and by means of which the entire frame-work of this end of the harvester is raised, the ground-wheel resting upon the earth, while the shaft of the same acts as a fulcrum for the raising of the said frame. Now it is apparent that as the vertical adjustment is being made the relative horizontal position of the driving sprocket-wheel and the driven sprocket-wheel is continually changing with a relative change in the position of the sprocket-chain, which also requires a like change in the tightening-arm, in order that a uniform tension may be given the chain at the different points of adjustment. To accomplish this purpose I attach the bar D at one end to the tightening-arm C, but allow the free end of said bar to rest upon the axle of the ground-wheel, so that the chain-bearing end of the arm rises and falls with the chain and other mechanism. When the chain becomes stretched by use, the bolt $c'$ is removed and passed through a lower hole, thereby raising the bearing end of the tightening-arm.

In the modification shown in Fig. 2 the same adjustment is made by means of the elongated slot and serrated rib-plates and washer, all of which will be readily understood without further description.

Having now described my invention, what I claim as new, and desire to secure by Letters Patent, is—

1. The combination of the ground-wheel axle, the sprocket-wheels, the sprocket-chain, the tightening-arm, the pivot-pin to the same, and the tightener adjusting-bar, all arranged and operating substantially as described and set forth.

2. The combination of the ground-wheel axle, the sprocket-wheels, the sprocket-chain, the tightening-arm, the pivot-pin, the adjusting-bar, and the bolts $c\ c'$, for operating the adjusting device, all arranged substantially as described, and for the purpose herein set forth.

ORVILLE COOLEY.

Witnesses:
G. W. FORD,
E. J. MOCKFORD.